Sept. 7, 1965  F. H. TENNIS ET AL  3,204,410
HYDROSTATIC DRIVE AND CONTROL MEANS THEREFOR
Filed Nov. 28, 1962  6 Sheets-Sheet 6

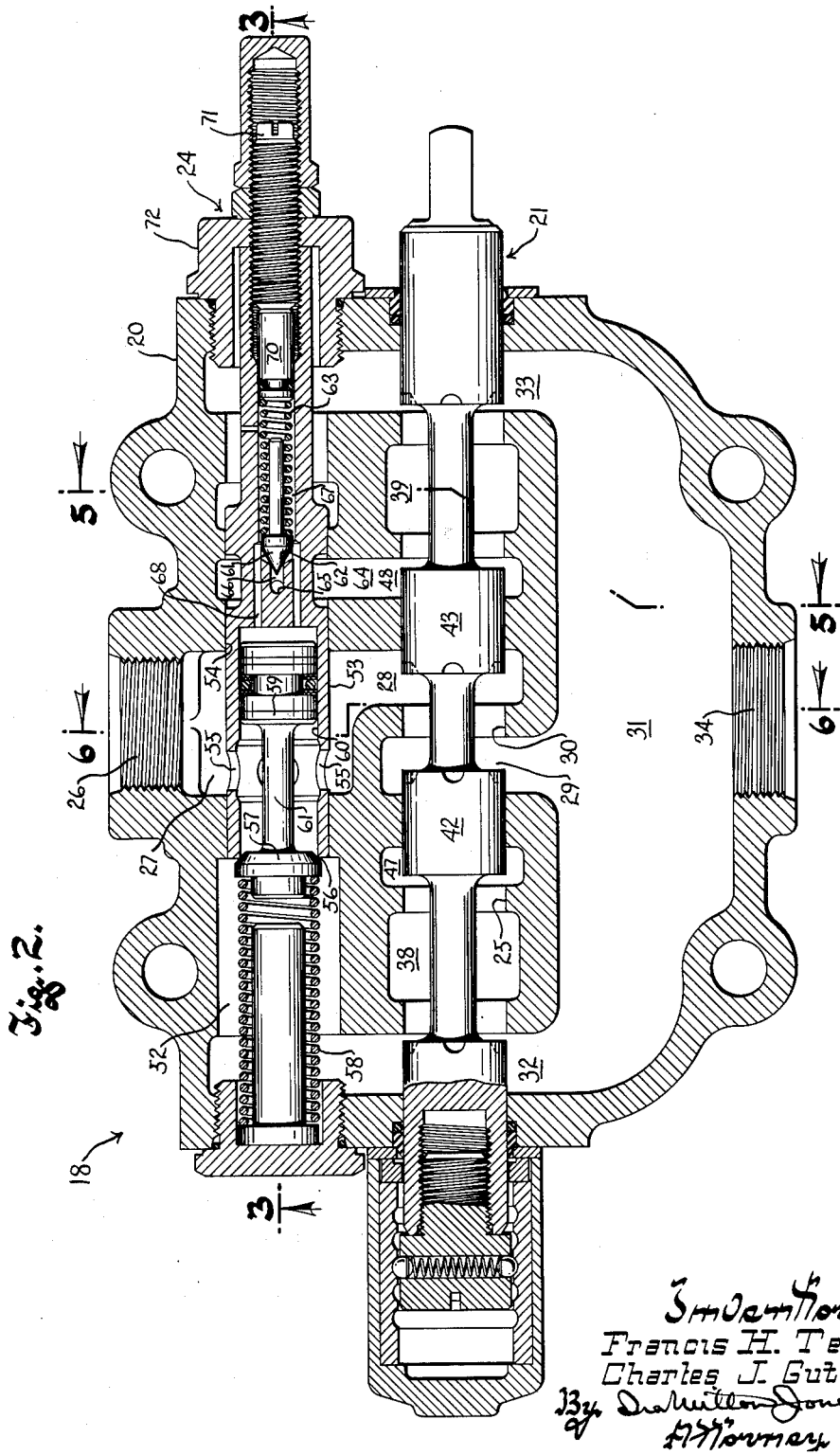

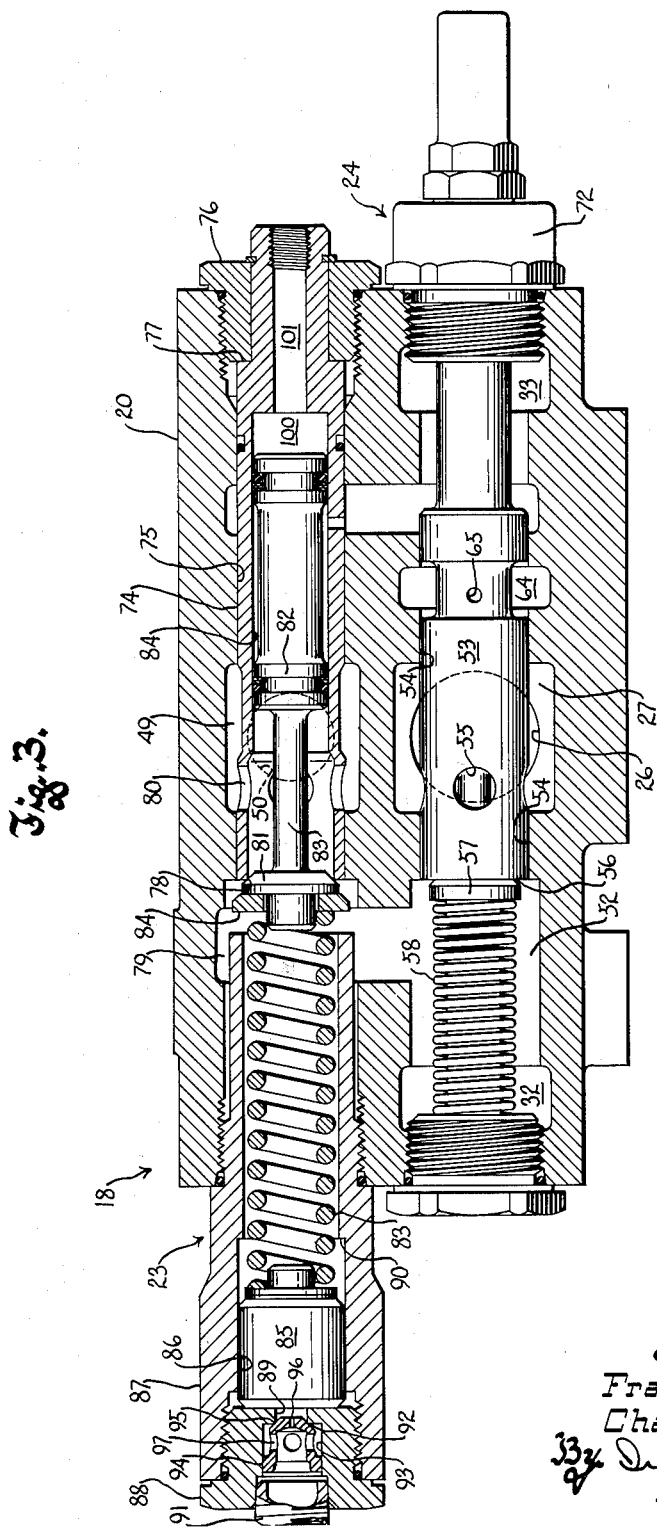

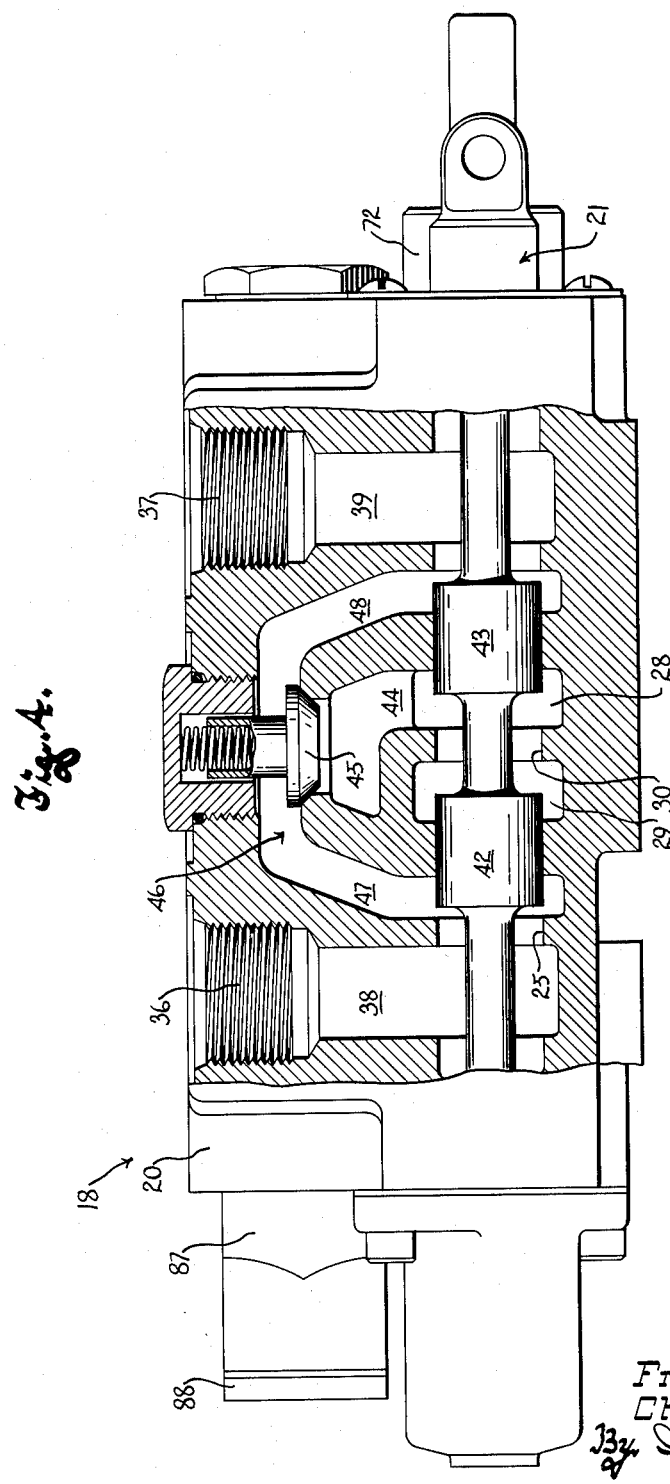

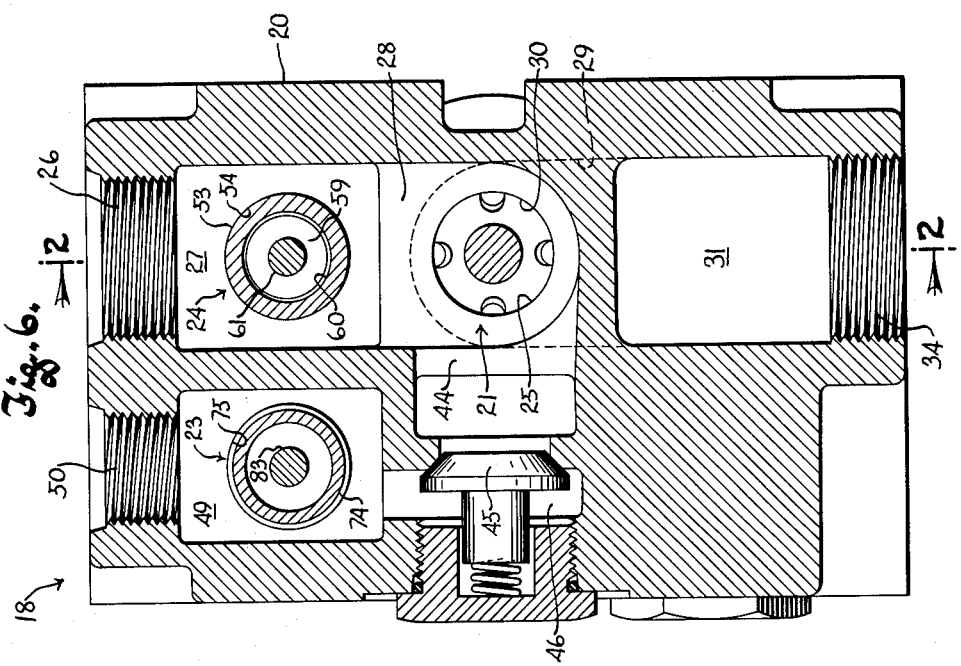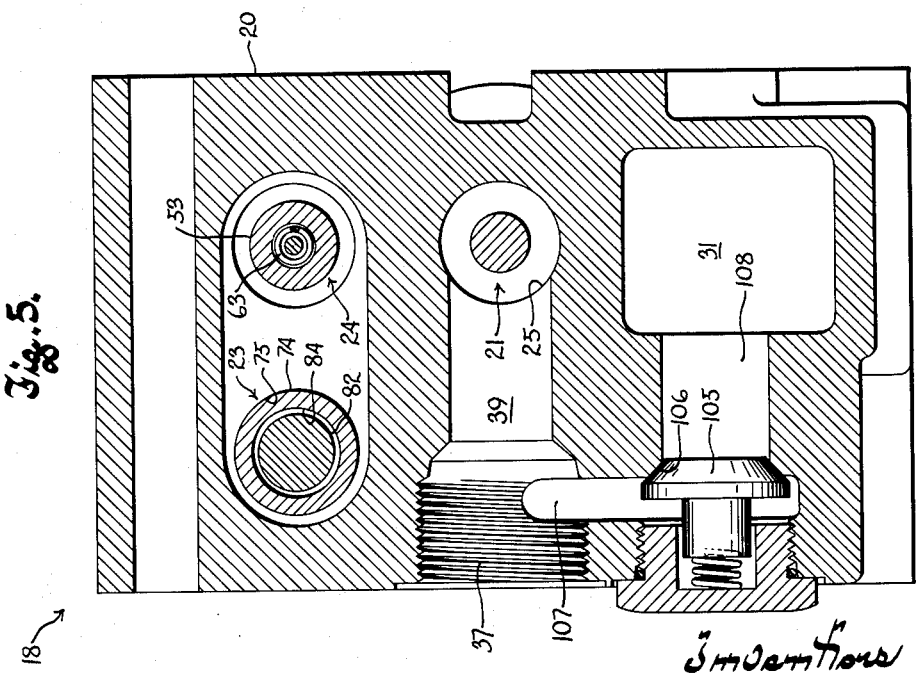

Inventors
Francis H. Tennis
Charles J. Guthrie

United States Patent Office

3,204,410
Patented Sept. 7, 1965

3,204,410
HYDROSTATIC DRIVE AND CONTROL
MEANS THEREFOR
Francis H. Tennis, Milwaukee, and Charles J. Guthrie, Waukesha, Wis., assignors to Hydraulic Unit Specialties Company, Pewaukee, Wis., a corporation of Wisconsin
Filed Nov. 28, 1962, Ser. No. 240,641
25 Claims. (Cl. 60—53)

This invention relates to hydraulic transmissions generally and has more particular reference to hydrostatic drives and to control means for governing the same.

In a broad sense, it is one of the purposes of this invention to provide means for driving a reversible hydraulic motor at each of a plurality of speeds in either direction.

More specifically, it is the purpose of this invention to provide a hydrostatic drive for a vehicle of the type having traction means and a prime mover for supplying power thereto, wherein the output of one or both of a pair of pumps driven by the prime mover is selectively routed to either the reversible hydraulic motor or to a reservoir from which the pumps are fed, through control means that features but a single manually operable control element.

By way of example, vehicles of the type for which the hydrostatic drive of this invention is ideally suited are bulldozers and front end loaders which have traction means such as wheels or endless treads, a prime mover usually comprising an internal combustion engine, and a boom carrying a bucket or blade at its outer end.

According to this invention, the control means provides a transmission having a neutral position, and having high and low speed positions for both forward and reverse travel of the vehicle. In the neutral position, the control means functions to bypass the output of both pumps to the reservoir and to also connect both sides of the reversible fluid motor to the reservoir. In the high speed position the control means functions to direct the combined output of both pumps to the motor for high speed operation of the vehicle either forwardly or in reverse; while in the low speed position, the control means functions to direct the output of only one of the pumps to the motor and to bypass the output of the other pump to the reservoir.

Another object of the invention resides in the provision of control means, for a hydrostatic drive of the character described, which features down-shifting means that is operable to automatically bypass the output of one of the pumps to the reservoir in consequence of the rise in fluid pressure that occurs when the vehicle, while operating at high speed, encounters exceptionally heavy loads. Downshifting may take place, for example, when the bucket or blade of the vehicle is run into a heavy pile of dirt or is digging into firm ground. When the automatic down-shifting means functions, the torque applied to the traction means by the hydraulic motor is increased by a substantial amount due to the fact that nearly all of the energy of the prime mover is then used to drive but one pump.

Still another object of the invention resides in the provision of a hydrostatic drive of the character described having control means which features unique relief valve mechanism that is operable to not only effect the down-shifting function mentioned, but also to effect bypassing to the reservoir of the outputs of both pumps in the event of pressure rise in the output fluid of one of the pumps above a predetermined high value, and to also delay reclosure of the relief valve mechanism so that in the event such high pressure values occur suddenly, as a result of shifting the transmission from neutral to either low or high speed, or from low speed to high speed, the load of the vehicle can be smoothly picked up without danger of damage to any of the components of the hydrostatic drive.

In this connection it is a further object of the invention to provide control means of the character described which automatically diverts to the reservoir pressure fluid intended for the hydraulic motor whenever the operator of the vehicle applies the brakes thereof.

A further and highly important object of the invention resides in the provision of control means which comprises a control valve having but a single control valve or spool which is movable back and forth in a bore in the body of the valve from a neutral position at which it effects bypass of the outputs of both pumps to the reservoir, to a first pair of operating positions at which it is operable to direct the output of but one of the pumps selectively to either side of the hydraulic motor and to return fluid from the other side of the motor to the reservoir, and to a second pair of operating positions at which it is operable to direct the combined outputs of both pumps selectively to either side of the hydraulic motor and to return exhausting fluid from the other side of the motor to the reservoir.

Still another object resides in the provision of anti-cavitation valves in the control means of this invention, to assure against voids forming in the hydraulic motor at times when the vehicle tends to travel of its own accord faster than it can be driven by the hydraulic motor.

With these and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

FIGURE 2 is a longitudinal sectional view through the control valve of this invention, taken on the plane of the line 2—2 in FIGURE 6, and illustrating the control spool in its neutral position;

FIGURE 3 is a cross sectional view taken through FIGURE 2 along the plane of the line 3—3;

FIGURE 4 is a cross sectional view of the control valve taken at the plane of the control spool axis, parts of the valve body being shown in elevation;

FIGURE 5 is a sectional view taken through FIGURE 2 along the line 5—5;

FIGURE 6 is a sectional view taken through FIGURE 2 along the line 6—6;

Figure 1:
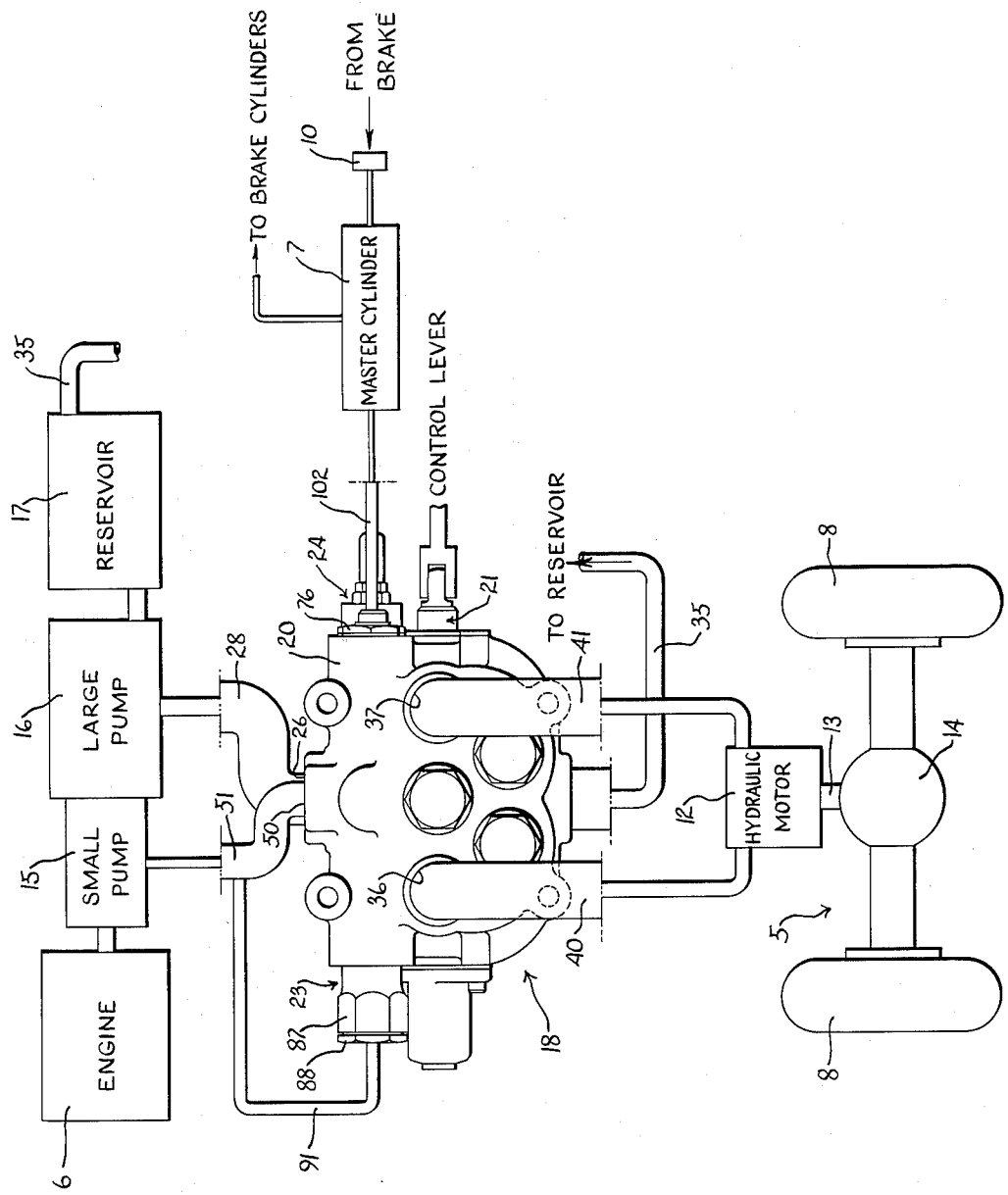
FIGURE 1 is a diagrammatic view of the hydrostatic drive of this invention.

Referring now more particularly to the accompanying drawings, in which like reference characters have been applied to like parts throughout the views, the numeral 5 in FIGURE 1 designates the traction means of a vehicle such as a front end loader. Such vehicles are equipped with a prime mover which may comprise an internal combustion engine 6, and a brake system which includes a master cylinder 7 for supplying fluid under pressure to brake cylinders (not shown) incorporated in the drive wheels 8 of the traction means whenever a brake pedal on the vehicle is depressed to actuate the plunger 10 of the master cylinder. It will be understood, of course, that in such vehicles as bulldozers, the traction means may often comprise endless treads, instead of the drive wheels 8.

Driving torque is imparted to the wheels 8 from the engine 6 through a reversible hydraulic motor 12 that has an output shaft 13 connected with the differential 14 of the traction means. This is accomplished by the hydrostatic drive of this invention, which includes a pair of pumps driven by the engine 6, namely a small pump 15 and a large pump 16, supplied with hydraulic fluid from a reservoir 17. The hydrostatic drive also includes control means, generally designated 18, which is operable to selectively direct the outputs of the pumps to either the reservoir or the hydraulic motor.

The control means 18 comprises a control valve having a body 20 and a single control spool or valve element 21 which is actuatable to different positions to place the transmission afforded by the control means in either neutral, high speed drive, or low speed drive. The control valve is also provided with novel relief valve mechanisms generally designated 23 and 24, which serve a variety of functions including automatic-down-shifting, the relief of excessive flud pressures including those generated as a result of shift shock in consequence of moving the control spool from one position to another in the valve body, and the automatic relief of all fluid pressure in the hydrostatic drive in the event the operator of the vehicle applies the vehicle brakes.

The control valve body is provided with a bore 25 in which the control spool 21 is received for axial sliding movement from a normal position of the spool seen in FIGURE 2, at which the transmission is in neutral, to a number of operating positions to be described later. The body is provided with an inlet port 26 which opens to the top of the body at a location directly over the spool 21. The inlet port 26 opens downwardly to an inlet chamber 27, which is communicated with the outlet of the large pump 16 as by an outlet duct 28 connected with the pump at one end and with the inlet port 26 at its other end.

Output fluid from the large pump 16 enters the chamber 27 from the inlet 26 and is conducted to the bore 25 from the control spool 21 through the upstream branch 28 of a through or open center passage having its downstream branch 29 connecting with the branch 28 through a short section 30 of the bore. As is customary, the downstream branch 29 of the through passage opens directly into an exhaust chamber 31. Opposite exhaust branch passages 32 and 33 communicating with the exhaust chamber extend upwardly therefrom and intersect the bore 25 near its ends. Fluid flowing into the exhaust chamber leaves the valve body through an outlet port 34 in its bottom, and can be returned to the reservoir by means of a duct 35 as shown in FIGURE 1.

With the arrangement described, and which the control spool 21 in its neutral position seen in FIGURE 2, output fluid from the large pump 16 entering the inlet port 26 in the valve body is free to flow downwardly via the through passage to the exhaust chamber 31 for return to the reservoir. As will be described later, the control spool also connects both sides of the hydraulic motor 12 with the reservoir when the spool is in its neutral position.

The valve body is also provided with a pair of motor ports 36 and 37 which open to the exterior of the body at one side thereof and are located at the outer ends of service passages 38 and 39, respectively. The service passages communicate with the bore 25 in which the control spool operates at locations spaced to opposite sides of the junction between the through passage and the bore, but inwardly from the adjacent exhaust passage branches 32 and 33. As seen in FIGURE 1, the motor ports 36 and 37 are connectable to the opposite sides of the reversible hydraulic motor 12, as by means of motor supply ducts 40 and 41, respectively.

Pressure fluid in the inlet chamber 27, and hence from the large pump 16, may be diverted to the hydraulic motor 12 through one of the service passages 38 or 39 upon shifting of the control spool 21 out of its neutral position seen in FIGURES 2 and 4, to either of a pair of operating positions spaced to opposite sides of its neutral position, and at which one or the other of a pair of axially spaced lands 42 and 43 on the spool blocks the bore portion 30 connecting the upstream and downstream branches 28 and 29 of the through passage. This may occurr, for example, when the spool is shifted to the left from its neutral position to the operating position thereof seen in FIGURE 8, in which the land 43 closes the bore portion 30 so that pressure fluid can no longer flow directly to the exhaust chamber 31 from the inlet chamber 27. Instead, such fluid is diverted by the spool into a feeder passage 44, that communicates with the inlet chamber 27, where it unseats a check valve 45 governing communication between the feeder passage and a bridge passage 46, which may be considered a part of the feeder passage that is downstream from the check value. As seen in FIGURE 4, the bridge passage has an inverted U-shape, with the check valve opening to its bight, and its opposite legs 47 and 48 communicating with the bore at locations spaced to opposite sides of the through passage but inwardly from the service passages 38 and 39.

Figure 8:
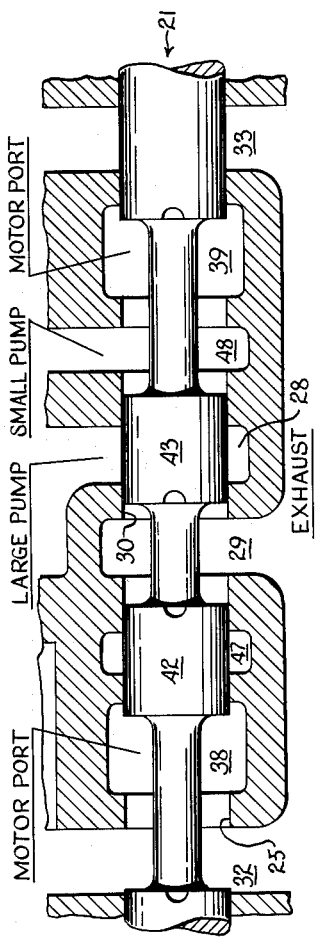

Hence, when the control spool 21 is shifted to the left to its position seen in FIGURE 8, its land 43 blocks the portion 30 of the bore and pressure fluid from the outlet of the large pump is diverted into the right hand leg 48 of the bride passage, which is then in communication through the spool bore with the right hand service passage 39, and pressure fluid flows through the motor supply duct 41 to thet right hand side of the hydraulic motor 12 to drive the same in one direction. Hydraulic fluid exhausting from the left side of the hydraulic motor is returned by the supply duct 40 to the other service passage 38, from whence it may flow through a portion of the spool bore into the left hand branch 32 of the exhaust passage for return to the reservoir.

Similarly, if the control spool is shifted to the right, from its neutral position, to an operating position at which its land 42 blocks the through passage at the bore, it effects diversion of pressure fluid into the service passage 38 through the leg 47 of the bridge passage, so that pressure fluid flows to the left side of the motor, with fluid exhausting from the other side thereof returning to the service passage 39 for flow to the adjacent branch 33 of the exhaust passage, and hence to the reservoir.

From the description thus far, it will be apparent that the control valve embodies a more or less conventional arrangement of passages and a control spool to govern communication therebetween, as may be seen, for example, in the Tennis Patent No. 2,873,762, issued on February 17, 1959.

According to this invention, the two operating positions of the control spool 21 described are actually the high speed drive positions of the transmission provided by the control valve, in which the output of the small pump 15 is combined with that of the large pump 16 for flow to the hydraulic motor in the manner set forth. The output of the small pump, however, is fed directly into the bridge passage 46 from an inlet chamber 49 in the valve body located alongside the inlet chamber 27 (see FIGURE 6).

The inlet chamber 49 opens upwardly to the exterior or top of the valve body through a port 50 which may be connected by a duct 51 with the outlet of the small pump 15. Consequently, presusre fluid from the small pump 15 flows directly into the bridge passage, at the side of the check valve 45 therein remote from the spool bore so as to tend to hold the check valve seated.

Whenever the check valve is unseated, as for example when the control spool has been shifted to either of the two operating positions described earlier to cause output fluid from the large pump to flow to one or the other of the service passages, the outputs of both the small and the large pumps are combined in the bridge passage 46 for flow to one side or the other of the hydraulic motor, to drive the same at high speed in either direction.

In addition to the two high speed drive positions described, the control spool has a second pair of operating positions spaced equal but shorter distances to opposite sides of the neutral position shown in FIGURE 2, and in each of which the lands 42 and 43 on the control spool leave the central portion 30 of the spool bore open to an extent such that all of the pressure fluid from the large pump 16 may flow through the through passage to the exhaust chamber 31 in the valve body, and only the output of the small pump is caused to flow to one side or the other of the hydraulic motor 12. This constitutes the slow speed and high power position of the transmission now about to be described, and at which the entire output of the large pump is bypassed to the reservoir.

Figure 7:
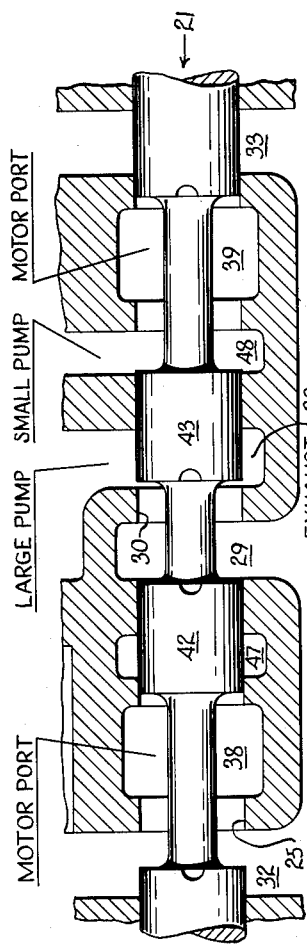
FIGURES 7 and 8 are diagrammatic sectional views similar to FIGURE 2, illustrating the positions of the control spool at the slow and high speed positions of the spool, respectively.

On of the low speed-high power positions of the control spool is illustrated in FIGURE 7, where it will be seen that the control spool 21 has been shifted to the left of neutral a distance such as to close off the service passage 39 from the exhaust branch 33 and to direct the entire output of the small pump through the bridge leg 48 to the service passage 39 for flow to the right side of the motor 12, while the entire output of the large pump is bypassed via the still open through passage to the exhaust chamber 31 for return to the reservoir. The service passage 38 receives fluid exhausting from the left side of the motor, and such exhaust fluid flows through the spool bore to the exhaust branch passage 32.

If the spool 21 is shifted an equal distance to the right of its neutral position, it directs the output of the small pump to the left side of the motor, and conducts fluid then exhausting from the right side of the motor to the reservoir via service passage 39 and exhaust passage branch 33. This drives the motor in the opposite direction.

In these two operating positions of the spool just described, substantially the entire energy of the internal combustion engine is utilized to drive the small pump, and hence the vehicle will be driven at low speed but with substantially greater tractive effort, for example, to readily enable the vehicle to drive its shovel or blade into a pile of dirt or to dig into firm ground.

In contrast, when the control spool is shifted to either of its first two designated operating positions at which the outputs of both pumps are combined and fed to one side or the other of the hydraulic motor, the vehicle will be driven at higher speeds but with less power.

In distinction to conventional control valves of the type disclosed in the Tennis patent identified hereinbefore, the control spool of the valve of this invention is so shaped as to communicate both of the service passages 38 and 39 with their adjacent exhaust passage branches in the neutral position of the spool seen in FIGURE 2. Hence, when the transmission is in neutral, both sides of the motor 12 are communicated with the reservoir.

According to this invention, the relief valve mechanism 24 mentioned previously provides an automatic downshifting device that is operable in either of the high speed drive positions of the control spool (FIGURE 8) to effect bypass to the reseroir of the output of the large pump 16 at times when more power is needed to drive the vehicle than is available during high speed operation of the hydraulic motor. For example, this may occur when the operator desires to take advantage of the inertia forces of the vehicle while traveling at high speed, to more effectively ram the shovel of the vehicle into a pile of material to be moved from one location to another. At such times, of course, the energy of the internal combustion engine is being used to drive both pumps and there will be a minimum of power available to drive the shovel farther into the pile of material after its initial contact therewith. As a result, the pressure of fluid in the bridge passage 46 and consequently in the inlet chamber 49 of the small pump rises, and this pressure rise is utilized to effect unseating of the relief valve mechanism 24 and bypass to the exhaust chamber 31 of the entire output of the large pump 16.

For this purpose the inlet chamber 27 for the large pump is communicated with the left hand branch 32 of the exhaust passage through a relief passage 52 which is governed by the relief valve mechanism 24.

The relief valve mechanism 24 is housed in a tubular carrier 53 that is received in a bore 54 in the valve body, located above and parallel to the spool bore 25, and intersecting the inlet chamber 27. The tubular carrier thus extends across the inlet chamber 27, and its interior is communicated therewith through a series of radial holes 55 in the wall of the carrier. That end of the tubular carrier 53 which is adjacent to the relief passage 52 opens thereto through an annular valve seat 56 that faces the relief passage. The head 57 of a relief valve member normally engages the seat 56 to block the escape of fluid from the chamber 27 and the interior of the carrier 53 to the relief passage 52. The relief valve member is biased by a spring 58 toward engagement with the seat 56, to a closed position blocking communication between the relief passage 52 and the interior of the tubular carrier 53.

The relief valve mechanism 24 is of the pilot operated type and comprises a piston 59 that slides back and forth in a cylinder 60, provided by a portion of the tubular carrier, and connected with the head 57 of the relief valve member by a stem 61 which locates the piston 59 at the side of the radial holes 55 remote from the head 57 of the valve member.

Pressure fluid in the inlet chamber 27 normally enters the inner section of the relief passage 52 provided by the tubular carrier 53 at a location between the head 57 of the relief valve member and the piston 59, so as to exert opposite but equal forces thereon to normally balance the relief valve member.

The space in the cylinder 60 behind the piston 59 is communicable with the leg 48 of the bridge passage 46, and hence with the inlet chamber 49 for the small pump through passages in the carrier 53 that are controlled by a pilot poppet mechanism mounted in the carrier, and which mechanism comprises a poppet 61, an annular valve seat 62, and a spring 63 that acts upon the poppet 61 to normally yieldingly maintain it engaged with its seat. The passages referred to include an upward extension 64 of the bridge leg 48, which leads to the bore 54 in which the relief valve mechanism 24 is mounted, and which is communicated with the underside of the pilot seat 62 through a radial hole 65 in the carrier 53 and a short centrally located small diameter axial passage 66 in the carrier. The passage 66 opens through the pilot seat 62 into a chamber 67 in the carrier, in which both the pilot poppet and its spring are located. A pair of axially extending passages 68 in the carrier communicate the chamber 67 with the space in the cylinder 60 behind the piston 59.

The compression spring 63 is confined between the poppet 61 and an adjustable spring seat member 70 that is axially slidably received in the chamber 67 and held in different positions of adjustment by an adjusting screw 71 threaded in the bushing 72 that holds the carrier in place in the valve body.

Normally the spring 63 holds the pilot poppet seated to thus block communication between the cylinder 60 and the bridge passage 46. Whenever the pressure of fluid in the bridge and hence in the inlet chamber 49 from the small pump rises to a predetermined high value, the pilot poppet is unseated by such fluid under pressure in the passage 66 so that fluid flows past the poppet and through the longitudinal passages 68 into the cylinder 60 where it forces the piston to the left and moves the head 57 of the relief valve member off of its seat 56. When that occurs, all of the fluid entering the chamber 27 from the large pump is bypassed to the exhaust chamber 31 for flow to the reservoir, and the output of only the small pump is fed to the hydraulic motor so that the vehicle will be driven at low speed and maximum power.

Figure 9:
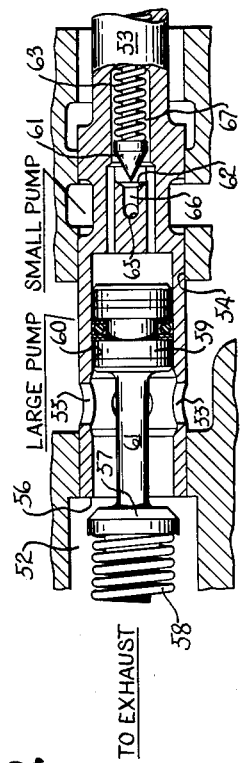
FIGURE 9 is a fragmentary sectional view illustrating details of the down-shift relief valve.

The positions of the parts of the relief valve mechanism 24 at which the pilot poppet is off its seat and pressure fluid from the inlet chamber 49 acts on the piston to unseat the relief valve member is shown in FIGURE 9.

Merely by way of example, the compression spring 63 acting on the pilot poppet 61 may be so adjusted by its adjusting screw 71 as to yield and permit unseating of the pilot poppet and consequently actuation of the relief valve mechanism to its open position when the pressure of fluid in the inlet chamber 49 rises to about 775 p.s.i.

The relief valve mechanism 23 is associated with the inlet chamber 49 of the small pump, and is similarly mounted in a tubular carrier 74 that extends across the inlet chamber 49 and is received in a bore 75 in the body. The carrier 74 is held in place by a bushing 76 that is threaded into the valve body and bears against a shoulder 77 on the carrier adjacent to one end therof. The other end of the tubular carrier opens through an annular valve seat 78 formed thereon into a relief passage 79 that communicates with the left hand branch 32 of the exhaust passage in the valve body.

The carrier 74 likewise has radial holes 80 in its side wall to communicate its interior with the inlet chamber 49 at a location intermediate the head 81 of a relief valve member in the carrier, and a piston 82 which is joined to the valve head 81 by means of a stem 83. In this case, however, the bore portion 84 of the carrier in which the piston is received provides a cylinder that is slightly reduced in diameter so that pressure fluid from the inlet chamber 49 exerts a slightly greater force on the underside of the head 81 of the relief valve member tending to unseat the same than it does upon the piston 82 tending to hold the valve closed.

A substantially strong compression spring 83 acts upon the head 81 of the relief valve member to yieldingly maintain the same closed against its seat 78. One end of the spring is engaged with a washer 84 that lies against the head 81, and its other end engages a piston 85 that is axially slidable in a cylinder 86 in the interior of a tubular spring guide member 87 threaded into the valve body.

A bushing 88 which is threaded into the outer end of the spring guide member 87 and has a central passage 89 therein leading to the cylinder provides for the introduction of pressure fluid into the cylinder to normally hold the piston 85 therein at a spring loading position at which it engages a shoulder 90 in the guide member. This shoulder, of course, defines the inward limit of motion of the piston, while the bushing itself defines the outer limit of travel of the piston.

As long as fluid under pressure holds the piston 85 against the shoulder 90, the compression spring 83 will be loaded and will exert sufficient force on the head 81 of the relief valve member 23 to maintain it engaged with its seat 78, against the tendency of pressure fluid in the inlet chamber 49 to unseat it.

The relief valve mechanism 23 comprises the main relief valve of the control means, and it remains closed during all normal operation of the system. For this reason, the spring loading piston 85 is subjected to the pressure of fluid obtaining in the inlet chamber 49 for the small pump 15. This may be accomplished, for example, by a duct 91 which connects the passage 89 in the bushing 88 with the delivery duct 51 for the small pump, in the manner seen in FIGURE 1.

Should the pressure of fluid in the inlet chamber 49 rise to an excessively high value corresponding to the relief setting of the relief valve spring 83, such pressure is exerted upon the underside of the head 81 of the relief valve member to cause the same to be moved off of its seat against the bias of the spring 83 to thus effect dumping of the output of the small pump to the exhaust chamber 31 in the valve body for return to the reservoir. Merely by way of example, the pressure value at which opening of the relief valve mechanism 23 takes place may be on the order of 2600 pounds per square inch, and hence considerably higher than the pressure value at which the relief valve mechanism 24 opens.

It is important to note that the passage 89 in the bushing 88 opens outwardly through an annular valve seat 92 into a counterbore 93 in which a metering check valve 94 is slidably received. The check valve, which is of hollow construction, has a reduced inner end portion providing a tapered nose 95 that is normally held engaged with the seat 92 in consequence of fluid pressure forces acting upon the larger diameter outer end portion of the check valve. A small diameter metering orifice 96 through the nose of the valve restricts the flow of pressure fluid past the valve and into the cylinder 86 when the valve is closed, and a series of radial holes 97 through the cylindrical wall of the valve provide for free flow of fluid out of the cylinder 86 and past the valve whenever the check valve is off of its seat.

It will be appreciated, of course, that the check valve 94 opens only as a consequence of opening of the relief valve mechanism 23, at which time the inlet chamber 49 is communicated with the exhaust chamber 31 in the valve body. When this occurs, the pressure in the output duct 51 of the small pump drops substantially and the spring 83 pushes the piston 85 outwardly to expel fluid from the cylinder 87. The fluid exhausting from the cylinder unseats the check valve 94 and flows back to the delivery duct 51 of the small pump.

The pressure of fluid in the delivery duct 51 of the small pump is relied upon to effect reclosure of the relief valve mechanism 23. Such reclosure, however, is delayed due to the fact that fluid returning to the cylinder 86 from the small pump first causes the check valve 94 to move onto its seat 92, thereby permitting a very restricted or metered amount of fluid to flow through its orifice 96 to the cylinder. This causes the piston 85 to be slowly driven inwardly toward engagement with its stop 90 to the position at which it fully loads the spring 83 so that the latter effects reengagement of the head 81 of the relief valve member with its seat 78 under the desired spring force.

The relief valve mechanism thus described will not only relieve excess pressures that build up gradually in the inlet chamber 49, but it also operates to relieve shock pressures that occur as a result of shifting of the control spool 21 to its different operating positions, as from neutral to either a high or low speed position. In this latter case, the metering check valve 94 functions to assure a gradual and smooth takeup of the load imposed upon the hydraulic transmission whenever the control spool is shifted from a neutral to a low or high speed position of the transmission, or from a low speed to a high speed position.

Another important feature of the control means 18 of this invention is that it automatically effects bypass to the reservoir of any pressure fluid intended for the hydraulic motor at times when the vehicle is operating at either high or low speed, and the operator applied the vehicle brakes. When that occurs, fluid pressure forces are imposed upon the piston 82 to move the same in the direction to carry the head 81 of the relief valve member off of its seat 78. As described earlier, the piston 82 operates in a cylinder 84 within the carrier 74. The space 100 in the cylinder behind the piston 82 may be supplied with pressure fluid through a reduced passage 101 in the carrier, opening to the exterior of the valve body through the bushing 76.

A tube line 102 which is connected at one end with the master cylinder 7 of the brake system on the vehicle and at its other end with the mouth of the passage 101 provides for conducting pressure fluid from the master cylinder into the cylinder space 100 whenever the brakes are applied. Thus, such fluid under pressure from the master cylinder, introduced into the cylinder space 100, forces the piston 82 in the direction to unseat the head 81 of the relief valve member and thereby communicate the inlet chamber 49 for the small pump with the exhaust chamber 31 in the valve body.

In the event that the vehicle brakes are applied at a time when the outputs of both pumps are being directed to one side or the other of the motor 12 by the control spool 21, the pressure fluid flowing into the inlet chamber 27 for the large pump will also be conducted to the exhaust chamber 31 for return to the reservoir, through the then open check valve 45 governing communication between the inlet chamber 27 and the bridge passage 46 into which the inlet chamber 49 for the small pump opens. Consequently, the unloading function of the relief valve mechanism 23 is accomplished entirely without unseating of the relief valve mechanism 24 associated with the inlet chamber 27 for the large pump.

As soon as the operator releases the brakes, the gradual reclosure of the relief valve mechanism 23 in the manner described assures against such sudden reconnection of the hydraulic motor with the pumps as might result in damage to the system.

The control valve of this invention also features means to prevent voids being drawn in the hydraulic motor in the event the vehicle tends to travel faster than it can be driven by the hydraulic motor 12. This may occur, for example, as when the vehicle is riding down hill.

For this purpose a void control or anticavitation check valve 105 is provided for each of the motor ports 36 and 37, as shown in FIGURE 5, each such check valve being yieldingly biased to a position engaging a seat 106 formed at the junction of angled passages 107 and 108 in the valve body. The passage 107 for each valve leads to its adjacent motor port and the other passage 108 of each valve opens to the exhaust chamber 31.

The function of such anticivation valves is well understood by those skilled in the art, and it is sufficient to point out that each is adapted to open in response to a rise in fluid pressure in the exhaust chamber 31 and a corresponding drop in pressure at its associated motor port such as tends to produce a void in the hydraulic motor. Upon opening of the check valve in this manner, exhaust fluid from the chamber 31 may flow to the motor port which is then in communication with one or the other of the pumps, or both, so that the supply of pump fluid being fed to the motor is augmented by exhaust fluid to prevent cavitation in the motor.

From the foregoing description, together with the accompanying drawings, it will be readily apparent that this invention provides an improved hydrostatic drive featuring a control valve wherein but a single control spool is shiftable to produce either forward or reverse operation, at either of two speeds, of a vehicle in which the drive is incorporated.

What is claimed as our invention:

1. A control valve for effecting operation of a reversible fluid motor in either direction at either of two speeds, which motor is of the type having a pair of ports either of which is adapted to serve as an inlet for motive fluid under pressure while the other provides an outlet, said control valve comprising:
    (A) a body having
        (1) a first inlet passage into which pressure fluid may be fed from a first source of fluid under pressure,
        (2) a second inlet passage into which pressure fluid may be fed from a second source of fluid under pressure,
        (3) an exhaust passage,
        (4) a pair of service passages to provide for connection of the control valve with the ports of a reversible fluid motor,
        (5) a bore with which said inlet, exhaust and service passages connect,
        (6) and a single valve element shiftable in the bore to selectively connect the service passages with the inlet and exhaust passages;
    (B) means on the valve element operable in a neutral position thereof to communicate both of said inlet passages with the exhaust passage;
    (C) means on the valve element operable upon shifting thereof from one to the other of a first pair of operating positions to in turn connect each of said service passages with one of the inlet passages and the other service passage with the exhaust passage;
    (D) means on the valve element operable to connect the inlet passage not connected to a service passage with the exhaust passage in each of said operating positions of the valve element;
    (E) and means on the valve element operable upon shifting thereof from one to the other of a second pair of operating positions to in turn connect each of said service passages with both inlet passages and the other service passage with the exhaust passage.

2. A control valve for effecting operation of a reversible fluid motor in either direction at each of two different speeds, comprising:
    (A) a body having
        (1) a first inlet into which pressure fluid may be fed from a first source of fluid under pressure,
        (2) a second inlet into which pressure fluid may be fed from a second source of fluid under pressure,
        (3) an outlet,
        (4) a pair of service ports to provide for connection of the control valve with the ports of a reversible fluid motor,
        (5) and a bore;
    (B) a single valve element movable in the bore for selectively connecting the service ports with the inlets and the outlet;
    (C) and cooperating passage defining means in the valve body and on the valve element
        (1) operable in a neutral position of the valve element to communicate both of said inlets with the outlet,
        (2) said passage defining means being operable upon movement of the valve element from one to the other of a first pair of operating positions to in turn communicate each of said service ports with one of the inlets and the other service port with the outlet, while connecting the inlet not communicated with a service port with the outlet in each of said operating positions of the valve element,
        (3) and said passage defining means being operable upon movement of the valve element from one to the other of a second pair of operating positions to in turn connect each of said service ports with both inlets and the other service port with the outlet.

3. The control valve of claim 1, wherein the valve element has means thereon which is operable in said neutral position of the valve element to connect both of said service passages with the exhaust passage.

4. A control valve for effecting operation of a fluid motor at different speeds, comprising:
    (A) a body having
        (1) a first inlet passage into which pressure fluid may be fed from a first pump,
        (2) a second inlet passage into which a pressure fluid may be fed from a second pump,
        (3) a service passage that is connectable with a fluid motor, (4) an exhaust passage,
(5) and a bore;
(B) a valve element in said bore movable from a neutral position to each of two operating positions;
(C) cooperating passage defining means in the body and on the valve element operable
(1) to communicate said first and second inlet passages with the exhaust passage in said neutral position of the valve element,
(2) to communicate the service passage with one of said inlet passages in one of said operating positions of the valve element while communicating the other inlet passage with the exhaust passage,
(3) and to communicate the service passage with both of said inlet passages in said second operating position of the valve element.

5. The control valve of claim 4, wherein said cooperating passage defining means is operable in said neutral position of the valve element to connect the service passage with the exhaust passage.

6. A control valve of the type wherein a valve element operating in a bore in the body of the valve normally occupies a neutral position at which it allows pressure fluid from a source thereof to flow through a bypass passage in the body from a pressure fluid inlet to a return passage in the body, but is movable to an operating position blocking the bypass passage at the bore and diverting pressure fluid from said inlet into a service passage via a feeder passage that communicates with the inlet through a normally closed check valve which is arranged to open away from said inlet, said control valve being characterized by: a second pressure fluid inlet in the body directly connected with said feeder passage, at the side of the check valve remote from said first designated inlet, for conducting pressure fluid from a second source thereof to the feeder passage for flow to the service passage along with pressure fluid from the first designated inlet in said operating position of the valve element.

7. The control valve of claim 6 further characterized by cooperating passage defining means on the valve element and in the valve body operable upon movement of the valve element to another operating position to connect said first designated inlet with the return passage, through the bore, while maintaining said second inlet in communication with the service passage via the feeder passage.

8. The control valve of claim 6, wherein the valve element is operable in another operating position thereof to open said bypass passage across the bore and thus communicate said first designated inlet with the return passage, while maintaining said second inlet in communication with the service passage via the feeder passage.

9. The control valve of claim 8, further characterized by other passage defining means on the valve element for communicating the service passage with the return passage through the bore in said neutral position of the valve element.

10. The control valve of claim 9, further characterized by means on the valve element operable in said neutral position thereof to communicate said second inlet with the return passage through the bore.

11. The control valve of claim 6, further characterized by:
(A) a relief passage in the body to communicate the return passage with said first designated inlet passage;
(B) a fluid pressure responsive relief valve mechanism in the body biased to a normal position closing said relief passage;
(C) and passage means in the body for subjecting said relief valve mechanism to the fluid pressure forces obtaining at the second inlet so as to effect opening of the relief valve mechanism in consequence of pressure rise at said second inlet to a predetermined relief value.

12. The control valve of claim 6, further characterized by:
(A) a relief passage in the body to communicate the return passage with said second inlet;
(B) a relief valve mechanism in the body biased to a normal position closing said relief passage, said relief valve mechanism having a fluid pressure responsive actuator by which the relief valve mechanism may be moved to an open position;
(C) and means on the body providing for subjection of said actuator to fluid pressure, from a source externally of the valve body, to effect opening of the relief valve mechanism.

13. A control valve of the type wherein a valve element normally occupies a neutral position in a bore in the body of the control valve to allow pressure fluid from a first source thereof to flow through a bypass passage to a return passage from an inlet into which such pressure fluid is fed, and wherein the valve element is movable to an operating position blocking the bypass passage at the bore and diverting pressure fluid from said inlet into a service passage via a feeder passage that communicates with said inlet through a check valve arranged to open away from the inlet, said control valve being characterized by:
(A) a second inlet the body connecting directly with said feeder passage at a location downstream from said check valve, for conducting pressure fluid from a second source thereof to the service passage along with pressure fluid from said first designated inlet in said operating position of the valve element;
(B) means in the body defining a first relief passage to communicate said first inlet with the return passage;
(C) means in the body defining a second relief passage to communicate said second inlet with the return passage;
(D) a pressure responsive relief valve in said first relief passage, set to open at a first predetermined pressure value;
(E) a pressure responsive relief valve in said second relief passage, set to open at a second predetermined pressure valve which is substantially higher than said first pressure value;
(F) and means in the valve body for subjecting both of said relief valves to the pressure of fluid obtaining in said second inlet.

14. The control valve of claim 13, further characterized by cooperating passage defining means on the valve element and in the body operable upon movement of the valve element to another operating position to communicate said first designated inlet with the return passage while maintaining said second designated inlet in communication with the service passage via the feeder passage.

15. The control valve of claim 13, further characterized by means in the valve body for delaying closure of the relief valve in said second relief passage after it has been unseated by fluid in said second inlet at a pressure in excess of said second predetermined value.

16. The control valve of claim 13, further characterized by means on the body for subjecting the relief valve in said second relief passage to pressure fluid from a third source thereof to enable it to be unseated at times when normal high pressure values obtain in said second inlet.

17. A control valve of the type having a body with an inlet passage to receive fluid under pressure, a service passage that is connectable with a fluid motor, an exhaust passage, a bore, and a valve element shiftable in the bore from a neutral position at which it effects bypass of pressure fluid from the inlet passage to the exhaust passage, to an operating position effecting diversion of pressure fluid from the inlet passage to the service passage and in consequence of which high shock pressures can be produced in the inlet passage, said control valve being characterized by the following:
- (A) means in the body defining a relief passage communicating at one end with the inlet passage and at its other end with the exhaust passage through an annular valve seat that faces away from the inlet passage;
- (B) a relief valve having a head cooperating with said seat, and upon which pressure fluid in the inlet passage acts tending to unseat the relief valve;
- (C) a compression spring having one end acting upon the valve head to yieldingly bias the same onto its seat;
- (D) a piston engaged with the other end of the spring;
- (E) means on the body defining a cylinder having one end opening toward the valve head, and in which the piston is received for sliding motion toward and from a normal position nearest the valve head at which it loads the spring and renders it operative to maintain the relief valve closed against the unseating forces imposed on its head by fluid at normal high pressures in the inlet passage while allowing the relief valve to open in response to excessively high fluid pressure in the inlet passage.
- (F) means on the body defining an inlet leading to the other end of the cylinder, through which fluid under pressure can be fed into the cylinder to act upon the piston and thus effect said loading of the spring;
- (G) and check valve means in said cylinder inlet, arranged to open away from the piston, and having an orifice therein which allows fluid to flow into the cylinder at a limited rate in the closed position of the check valve means.

18. A control valve of the type having a body with an inlet passage and a valve element shiftable from a neutral position to an operating position to block the flow of pressure fluid from the inlet passage to an exhaust passage and to instead divert such pressure fluid to a service passage, said control valve being characterized by:
- (A) a relief passage in the body to communicate the inlet and exhaust passages;
- (B) a relief valve mechanism in the body governing said relief passage and of the type having a valve member which opens in response to rise in pressure in the inlet passage to a predetermined relief value;
- (C) means in the body to yieldingly bias said relief valve member to closed position comprising
    - (1) a piston, movable toward and from the valve member,
    - (2) a compression spring confined between the piston and the relief valve member,
    - (3) and a cylinder in which the piston slides between defined limits from a normal spring loading position closest to the valve member, at which the spring holds the valve member closed against the unseating force that inlet fluid at normally high pressure values exerts thereon, to a spring unloading position farthest from the valve member, said cylinder having an inlet through which pressure fluid can be supplied thereto to effect movement of the piston to its normal spring loading position;
- (D) and normally closed check valve means in said cylinder inlet having an orifice therein to limit the flow of pressure fluid into the cylinder in the closed position of the check valve, said check valve being arranged to open in response to spring propelled movement of the piston toward its spring unloading position to permit free flow of pressure fluid out of the cylinder.

19. The control valve of claim 18, further characterized by:
- (A) a fluid pressure responsive plunger connected with the relief valve member for effecting unseating thereof at times when normally high pressures obtain in the inlet passage;
- (B) and means on the body providing for subjection of said plunger to fluid pressure.

20. Hydrostatic drive means for apparatus having a prime mover, comprising the combination of:
- (A) a reversible hydraulic motor;
- (B) a reservoir for hydraulic fluid;
- (C) first and second pumps driven by the prime mover and supplied with fluid from the reservoir;
- (D) and control means connected with the outlets of both pumps, the opposite sides of the motor, and with the reservoir, providing a fluid transmission having a single speed and directional control member that is movable to five different positions which comprise
    - (1) a neutral position at which the control means is operable to direct the outputs of both pumps to the reservoir,
    - (2) a pair of high speed positions at which the control means is operable to direct the combined outputs of both pumps to either side of the motor and to connect the other side of the motor with the reservoir,
    - (3) and a pair of low speed positions at which the control means is operable to direct the output of only one pump to either side of the motor and to connect the other side of the motor with the reservoir.

21. The hydrostatic drive means of claim 20, wherein one of said pumps has a smaller output than the other and provides for low speed high power operation of the hydraulic motor when its output alone is directed to the hydraulic motor by the control means.

22. The hydrostatic drive means of claim 20, further characterized by automatic downshifting means operable in the high speed position of the transmission to effect bypassing of the output of one of said pumps to the reservoir in response to a rise in the pressure of output fluid from the other of said pumps to a predetermined high value.

23. The hydrostatic drive means of claim 20 further characterized by:
- (A) relief valve mechanism which is caused to open to effect bypass to the reservoir of the output of one of said pumps in response to a rise in output pressure of said pump to a predetermined high value; and
- (B) means associated with said relief valve mechanism for delaying its reclosure.

24. A control valve for effecting operation of a reversible fluid motor in either direction at either of two speeds, which motor is of the type having a pair of ports either of which is adapted to serve as an inlet for motive fluid under pressure while the other provides an outlet, said control valve comprising:
- (A) a body having
    - (1) a first inlet passage into which pressure fluid may be fed from a first source of fluid under pressure,
    - (2) a second inlet passage into which pressure fluid may be fed from a second source of fluid under pressure,
    - (3) an exhaust passage,
    - (4) a pair of service passages to provide for connection of the control valve with the ports of a reversible fluid motor,
    - (5) bore means with which said inlet, exhaust and service passages connect,
    - (6) and valve means shiftable in said bore means to selectively connect the service passages with the inlet and exhaust passages;
- (B) means on the shiftable valve means operable in one position thereof to communicate both of said inlet passages with the exhaust passage;

(C) means on the shiftable valve means operable upon shifting thereof from one to the other of a first pair of operating positions to in turn connect each of said service passages with one of the inlet passages and the other service passage with the exhaust passage;

(D) means on the shiftable valve means operable to connect the inlet passage not connected to a service passage with the exhaust passage in each of said operating positions of the valve element;

(E) and means on the shiftable valve means operable upon shifting thereof from one to the other of a second pair of operating positions to in turn connect each of said service passages with both inlet passages and the other service passage with the exhaust passage.

25. Hydrostatic drive means for apparatus having a prime mover, comprising the combination of:

(A) a reversible hydraulic motor;
(B) a reservoir for hydraulic fluid;
(C) first and second pumps driven by the prime mover and supplied with fluid from the reservoir;
(D) control means connected with the outlets of both pumps, the opposite sides of the motor, and with the reservoir, providing a fluid transmission having
  (1) a neutral position at which the control means is operable to direct the outputs of both pumps to the reservoir,
  (2) a high speed position at which the control means is operable to direct the combined outputs of both pumps to either side of the motor and to connect the other side of the motor with the reservoir,
  (3) and a low speed position at which the control means is operable to direct the output of only one pump to either side of the motor and to connect the other side of the motor with the reservoir;
(E) relief valve mechanism which is caused to open to effect bypass to the reservoir of the output of one of said pumps in response to a rise in output pressure of said pump to a predetermined high value;
(F) means associated with said relief valve mechanism for delaying its reclosure;
(G) and another relief valve mechanism which is caused to open to effect bypass to the reservoir of the output of the other of said pumps in response to a rise in output pressure of said first designated pump to a value below said predetermined high value.

References Cited by the Examiner

UNITED STATES PATENTS

| | | | |
|---|---|---|---|
| 1,982,711 | 12/34 | Vickers | 60—52 |
| 2,651,324 | 9/53 | Hodgson et al. | 137—596.12 |
| 2,681,117 | 6/54 | Marcy | 60—53 X |
| 2,836,195 | 5/58 | Ziskal | 137—596.12 |
| 2,883,015 | 4/59 | Schroeder | 192—4 |
| 2,980,135 | 4/61 | Tennis | 137—596.12 |
| 3,042,162 | 7/62 | Hause | 192—4 |

FOREIGN PATENTS 468,478   7/37   Great Britain.

JULIUS E. WEST, *Primary Examiner.*

DAVID WILLIAMOWSKY, EDGAR W. GEOGHEGAN, *Examiners.*